United States Patent [19]
Jeong

[11] Patent Number: 6,159,571
[45] Date of Patent: Dec. 12, 2000

[54] PHASE-CHANGE OPTICAL DISC

[75] Inventor: Tae Hee Jeong, Seoul, Rep. of Korea

[73] Assignee: LG Electronics Inc., Seoul, Rep. of Korea

[21] Appl. No.: 09/134,367

[22] Filed: Aug. 14, 1998

[30] Foreign Application Priority Data

Aug. 14, 1997 [KR] Rep. of Korea ............ 97/39022

[51] Int. Cl.$^7$ ............................................ B32B 3/02
[52] U.S. Cl. .................... 428/64.1; 428/64.4; 428/64.5; 428/457; 428/913; 430/270.13; 430/495.1; 430/945; 369/283; 369/288
[58] Field of Search ............................ 428/64.1, 64.2, 428/64.4, 64.5, 457, 688, 702, 913; 430/270.13, 495.1, 945; 569/283, 288

[56] References Cited

U.S. PATENT DOCUMENTS

| | | | |
|---|---|---|---|
| 5,395,669 | 3/1995 | Kawahara et al. | 428/64.1 |
| 5,681,632 | 10/1997 | Kitaura et al. | 428/64.1 |
| 5,753,334 | 5/1998 | Yoshioka et al. | 428/64.4 |
| 5,817,389 | 10/1998 | Ono | 428/64.1 |
| 5,900,347 | 5/1999 | Ohkubo | 430/270.13 |

FOREIGN PATENT DOCUMENTS

| | | |
|---|---|---|
| 3-263626 | 11/1991 | Japan . |
| 8-129777 | 5/1996 | Japan . |

*Primary Examiner*—Elizabeth Evans

[57] ABSTRACT

A phase-change optical disc that is adapted to weaken a self-sharpening effect and to be driven by a pulse width modulation system. In the disc, a dielectric layer formed on the surface of a recording layer and a heat flow control layer is sequentially disposed. The heat flow control layer is formed to include a material having a high heat conductivity and a material having a low heat conductivity.

5 Claims, 5 Drawing Sheets

FIG.2A
PRIOR ART
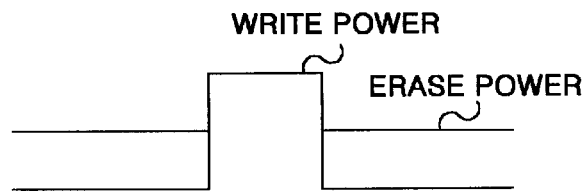
FIG.2B
PRIOR ART
FIG.2C
PRIOR ART
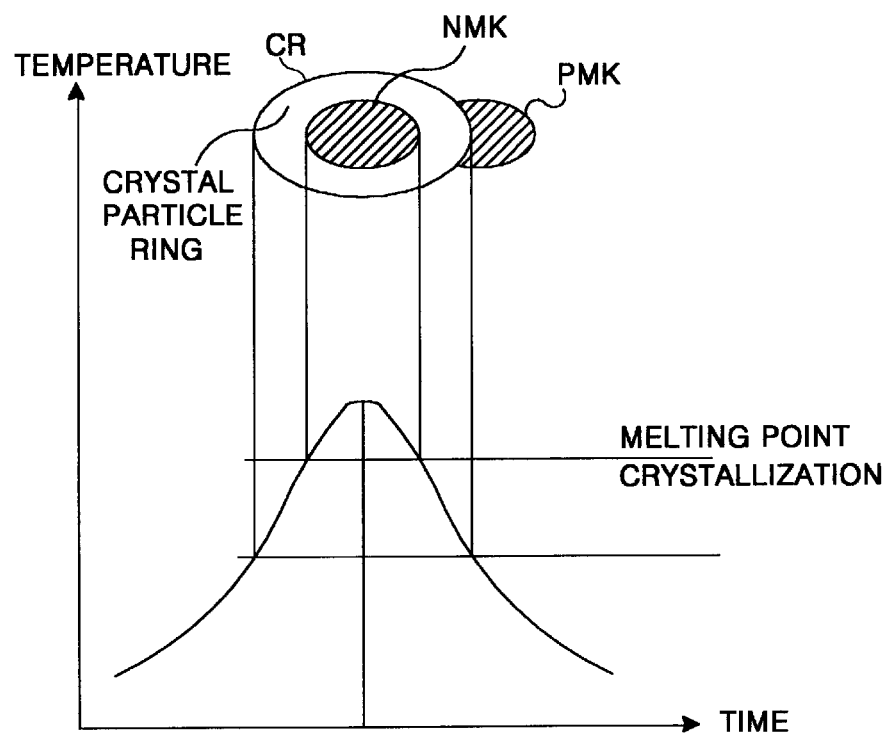

PHASE-CHANGE OPTICAL DISC

BACKGROUND OF THE INVENTION

1. Field of the Invention

This invention relates to a phase-change optical disc, and more particularly to a phase-change optical disc that is adapted to weaken a self-sharpening effect.

2. Description of Prior Art

Recently, recording media, such as a compact disc(CD) of write-once type, a recordable compact disc(CD-R), a rewritable compact disc(CD-RW), a magneto-optical disc(MOD), a pulse-change dual disc(PD), a digital versatile disc-random access memory(DVD-RAM) and so on, are commercially available. The discs such as Power Disc, CD-R and DVD-RAM have a phase-change characteristic so that an information can be repeatedly recorded. In such a phase-change optical disc, its combined structure is changed into an amorphous or crystal state by a laser light beam having a relatively great energy, thereby recording or erasing an information.

As shown in FIG. 1, the phase-change optical disc includes a first dielectric layer 4 made from $ZnS$—$SiO_2$, a recording layer 6 made from GeSb—$Sb_2Te_3$, a second layer 8 made from $ZnS$—$SiO_2$, a reflective layer 10 made from a metallic material such as Al or Au, and a protective layer 12 made from a ultraviolet hardening resin, which are disposed on the upper portion of a poly-carbonate substrate 2, in turn.

In the phase-change disc having a four-layer film structure in this manner, the recording layer 6 is reversibly changed between the crystal state and the amorphous state by a laser light beam to record or erase an information. Herein, the amorphous state means recording pits having a logical value of '1' while the crystal state means recording pits having a logical value of '0' or an unrecorded state. The amorphous state is formed by heating the recording layer at a temperature higher than a melting point and thereafter cooling it. A change from the amorphous state into the crystal state, that is, an erasure is performed by heating the recording layer at a temperature higher than the crystallization temperature of the recording layer. Further, the crystal state has a greater light reflectivity than the amorphous state so that an information recorded on the phase-change optical disc can be reproduced.

In order to access information recorded on the phase-change optical disc, a pulse position modulation(PPM) system determines upon a position of a mark, and a pulse width modulation(PWM) system depending upon a width of mark. The PPM system dedicated to the PD has a disadvantage in that it deteriorates the recording density of information. On the other hand, the PWM system applicable to recording media, such as CD-R, DVD-RAM and so on, has an advantage in that it improves the recording density of information.

In the above modulation systems, the laser light beam having a shape of a write pulse WP and a write power as shown in FIG. 2A is irradiated onto the phase-change optical disc so as to record an information on the phase-change optical disc. In this case, since a recording layer in a region irradiated with a light beam is melted and then cooled, a new mark NMK in an amorphous state as shown in FIG. 2B is written into the phase-change disc. Further, a crystal particle ring CR in a crystal state always appears in the peripheral of the new mark NMK. This crystal particle ring CR is formed by heating the peripheral of the region irradiated with a light beam having the write power as shown in FIG. 2A into a temperature between the crystallization temperature and the melting point temperature and thus changing the same into a crystal state. For example, when a light beam having an aperture number of 0.5 and a wavelength of 825 nm is irradiated onto the phase-change optical disc, a crystal particle ring CR having a width of 0.3 μm emerges around the mark. The crystal particle ring CR formed in this manner distinctly divides a boundary portion of the new mark NMK and the previous mark PMK such that an edge information of the new mark NMK is not influenced from a remaining signal due to the previous mark PMK.

The self-sharpening effect ("SSE") allowing the crystal particle ring to be formed as described above advantageously works on an information reproduced by the PPM system. Otherwise, the width of crystal particle ring CR is more enlarged as the size of mark becomes larger. In other words, as the size of mark is larger, the SSE becomes serious. This is caused by a fact that the phase-change optical disc has such a structure that a temperature of the recording layer 6 increases or decreases slowly and the top temperature thereof becomes relatively low. The crystal particle ring CR having a larger width in proportion to the size of mark weakens a characteristic of a signal reproduced from the phase-change optical disc using the PWM system. In view of this, there are required a new structure of phase-change optical disc that is suitable for weakening the SSE.

SUMMARY OF THE INVENTION

Accordingly, it is an object of the present invention to provide a phase-change optical disc that is adapted to weaken a self-sharpening effect.

A object of the present invention is to provide a phase-change optical disc that is adapted to be driven by a pulse width modulation system.

In order to achieve these and other objects of the invention, a phase-change optical disc according to the present invention includes a recording layer, a dielectric layer formed on the surface of the recording layer, and a heat flow control layer formed in such a manner to include a material having a high heat conductivity and a material having a low heat conductivity in the surface of the dielectric layer.

BRIEF DESCRIPTION OF THE DRAWINGS

These and other objects of the invention will be apparent from the following detailed description of the embodiments of the present invention with reference to the accompanying drawings, in which:

FIG. 2A illustrates a shape of a light beam applied to the phase-change optical disc during the recording;

FIG. 2B is a view for explaining a SSE appearing at the phase-change optical disc;

FIG. 2C is a view for explaining a temperature characteristic of a recording layer of the phase-change optical disc of FIG. 1;

DETAILED DESCRIPTION OF THE PREFERRED EMBODIMENT

Figure 1:
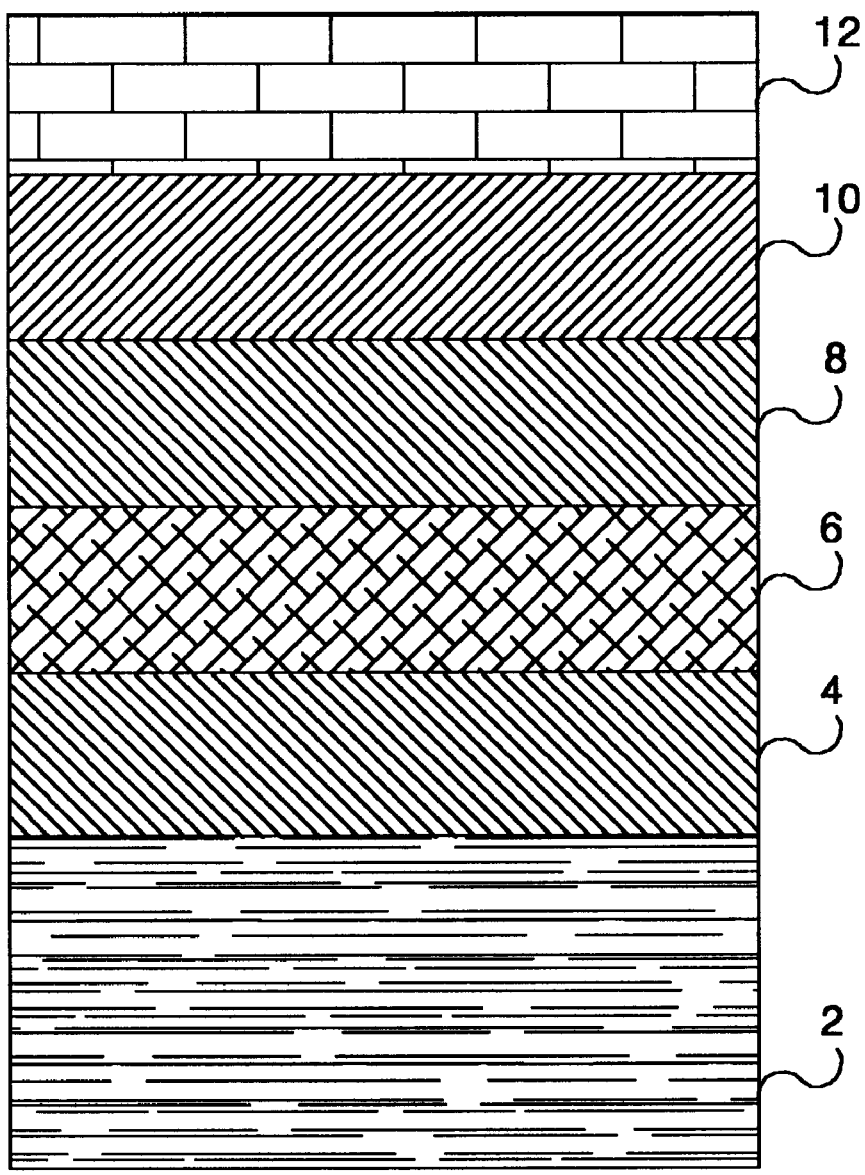
FIG. 1 is a sectional view showing a structure of a conventional phase-change optical disc.
Figure 3:
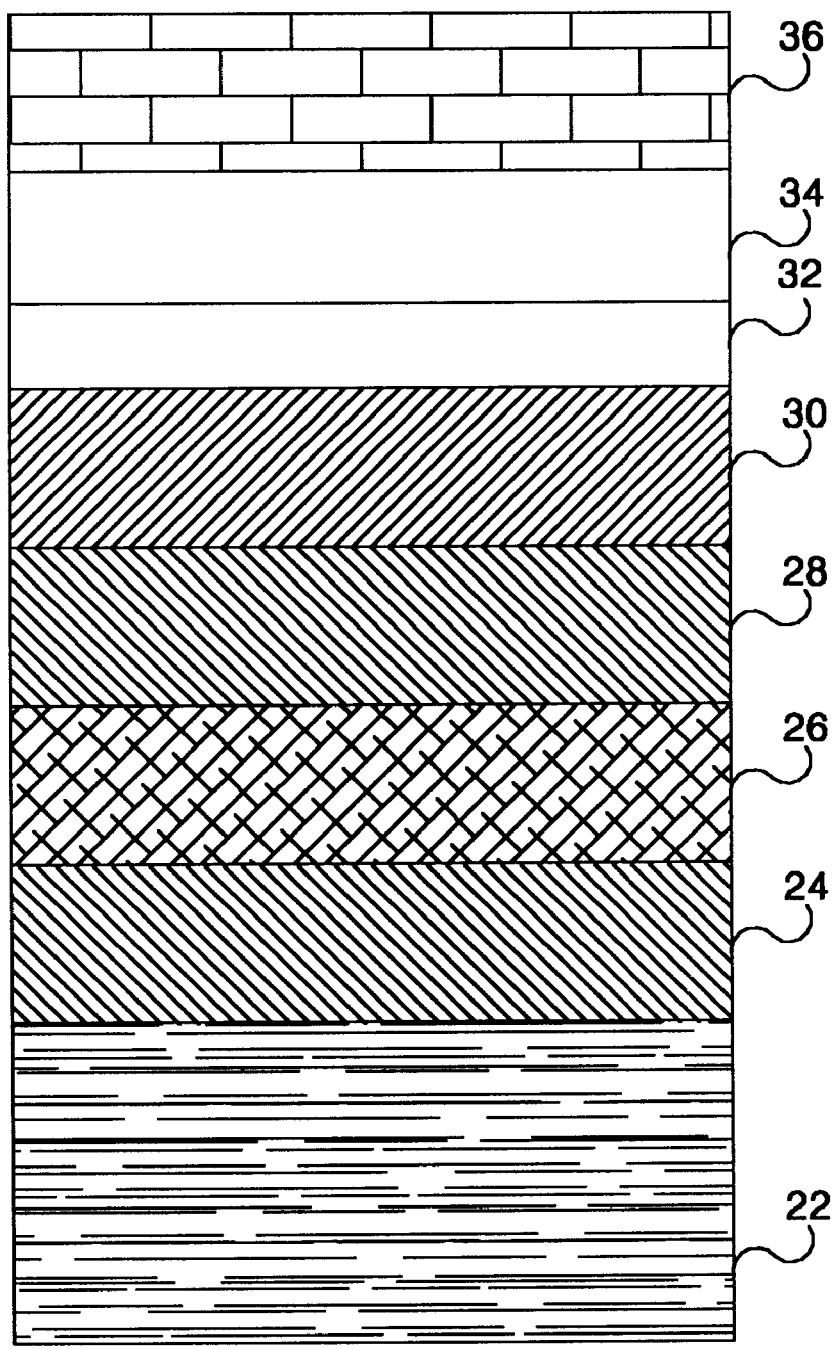
FIG. 3 is a sectional view showing a structure of a phase-change optical disc according to an embodiment of the present invention.

Referring to FIG. 3, there is shown a structure of a phase-change optical disc according to an embodiment of the present invention. In FIG. 3, the phase-change optical disc includes a first dielectric layer 24 disposed on the upper portion of a transparent substrate 22. The transparent substrate 22 is made from a polycarbonate in such a manner to have a thickness of 0.6 mm or 1.2 mm. The first dielectric layer 24 is formed to have a thickness of 100 to 300 nm by adhering a non-volatile gas ion, such as ZnS—$SiO_2$ including Ar, onto the surface of the transparent substrate 22 by means of a direct current(DC) or radio frequency(RF) magnetron sputtering method employing a predetermined power under a predetermined pressure.

The phase-change optical disc includes a recording layer 26 and a second dielectric layer 28 which are sequentially disposed on the upper portion of the first dielectric layer 24. The recording layer 26 is formed to have a thickness of 10 to 30 nm by adhering a non-volatile gas ion of GeSb—$Sb_2Te_3$ including Ar onto the surface of the first dielectric layer 24 by means of the DC or RF magnetron sputtering method. Likewise, the second dielectric layer 28 is formed to have a thickness of 10 to 30 nm by adhering the same non-volatile gas ion onto the surface of the recording layer 26 in a similar method to the first dielectric layer 24. Alternately, the first and second dielectric layers 24 and 28 may be formed of $SiO_2$, $(Zr_xCe_{1-x})_yO_{1-y}$, AlN or $Al_2O_3$, etc. besides ZnS—$SiO_2$. Such first and second dielectric layers 24 and 28 absorb heat from the recording layer 26 when the recording layer 26 is heated, thereby cooling the recording layer 26 suddenly. Meanwhile, the recording layer 26 is heated at a higher temperature than its melting point by a large energy light beam during the recording of information and thereafter is suddenly cooled by the first and second dielectric layers 24 and 28, so that it is changed from a crystal state into an amorphous state. Also, the recording layer 26 is heated at a temperature lower than its melting point and higher than its crystallization temperature by a light beam having an energy larger than the energy of light beam during the reproduction and smaller than the energy of the light beam during the recording and thereafter is suddenly cooled by the first and second dielectric layers 24 and 28, so that it is changed from the amorphous state into the crystal state. Such a recording layer 26 additionally includes a minor amount of Ag, Se, In or Co, etc. Besides GeSb—$Sb_2Te_3$. Alternately, the recording layer 26 may be formed of a material of Ag—In—Sb—Te group.

Figure 4:
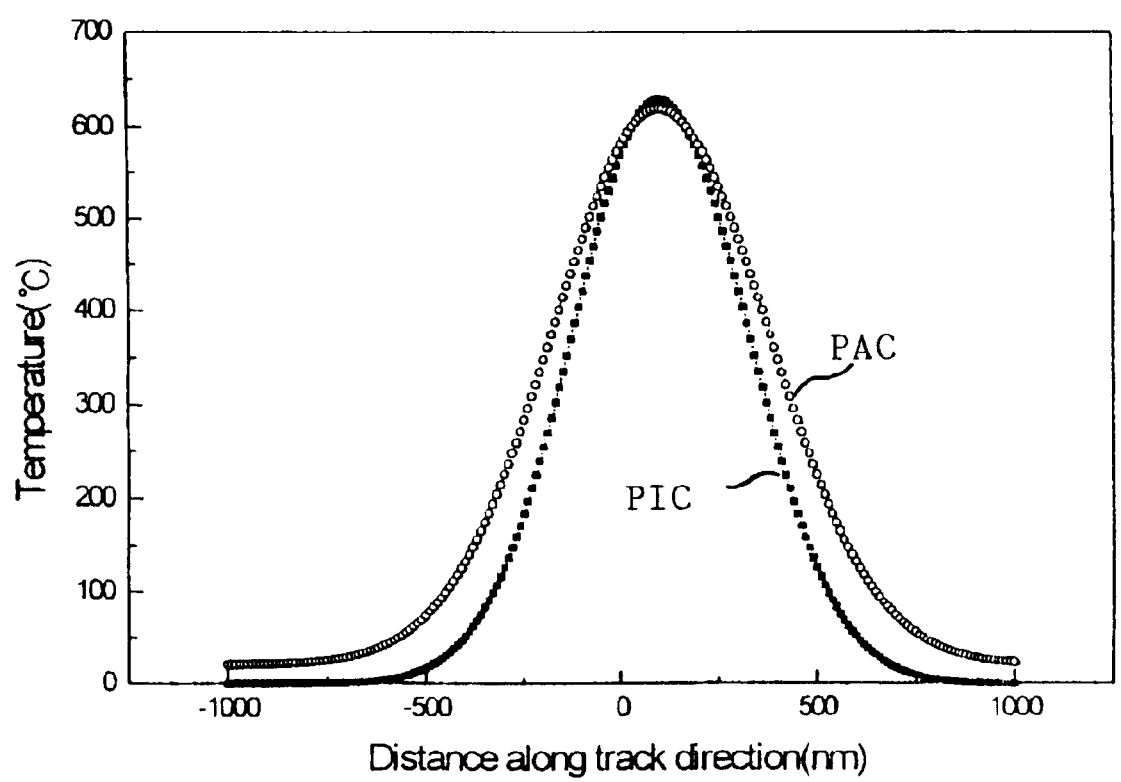
FIG. 4 represents a temperature change in the track direction of the recording layer of the phase-change optical disc in FIG. 3.

The phase-change optical disc further includes a reflective film 30, a heat compensating layer 32, a heat response expediting layer 34 and a protective film 36 which are disposed on the upper portion of the second dielectric layer 28, in turn. The reflective film 30 must have a minimum thickness in such a manner to freely conduct heat between the second dielectric layer 28 and the heat compensating layer 32 and to meet the reflectivity requirements. To this end, the reflective film 30 is formed to have a thickness of 20 to 50 nm by adhering a gas ion of Au or Al including Ar onto the surface of the second dielectric layer 28 by means of the DC or RF magnetron sputtering method. The reflective layer 30 formed in the above manner may additionally include Ti, Co or Cr besides Au or Al. The heat compensating layer 32 buffers the conducted heat between the recording layer 26 and the heat response expediting layer 34 when the temperature of the heat response expediting layer 34 rises and drops suddenly, thereby compensating for a temperature of the recording layer 26. To this end, the heat compensating layer 32 is formed to have a thickness of 20 to 50 nm by adhering non-volatile gas ions, such as ZnS—$SiO_2$, including Ar and having a relatively low heat conductivity onto the surface of the reflective layer 30 using the DC or RF magnetron sputtering method. Alternatively, the heat compensating layer 32 may include Si, SiN, $SiO_2$ and so on besides ZnS—$SiO_2$. Such a heat compensating layer 32 raises the sensitivity of write power in a light beam irradiated onto the recording layer 26 so as to record information on the recording layer 26. If the heat compensating layer 32 does not exist, the write power of the light beam becomes large so as to sufficiently raise the temperature of the recording layer 26 because heat is dissipated too quickly by the heat response expediting layer 34. By employing the heat compensating layer 32, the temperature of the recording layer 26 is sufficiently raised into the recording temperature(i.e., the melting point temperature) by means of a write power of a light irradiated onto the conventional optical disc having the four-layer structure. The heat response expediting layer 34 allows the temperature of the recording layer 26 to be suddenly raised or suddenly dropped during a recording process, that is, when a light beam is irradiated. To this end, the heat response expediting layer 34 is formed of Al or Au, etc. having a good heat conductivity in such a manner to have a sufficient thickness. For example, the heat response expediting layer 34 is formed to have a thickness of 50 to 100 nm by adhering the non-volatile gas ions of Al and Au, etc. onto the surface of the heat compensating layer 32 in a similar method to the heat compensating layer 32. The heat response expediting layer 34 formed in this manner allows a temperature in the track direction of the recording layer 26 to suddenly change as seen from curve PIC in FIG. 4. In FIG. 4, a curve PAC represents a temperature change in the track direction of the recording layer in the conventional phase-change optical disc. As a result, the heat response expediting layer 34 and the heat compensating layer 32 work as a heat flow control layer for controlling heat flow in the recording layer 26. This heat flow control layer allows the temperature of the recording layer 26 to be suddenly raised and dropped and to be a little more heightened. The protective layer 36 is formed by coating a ultraviolet hardening resin on the upper portion of the heat response expediting layer 34.

As described above, in a phase-change optical disc having a six-layer film structure adding the heat compensating layer 32 and the heat response expediting layer 34, a temperature in a region irradiated with a light beam rises suddenly and then drops suddenly, so that the width of a crystal particle ring formed around it is extremely arrowed. Accordingly, a signal reproduced from the phase-change optical disc according to an embodiment of the present invention using the PWM system is minimized from an affection due to the SSE. These advantages will be apparent from FIG. 5A and FIG. 5B.

Figure 5A:
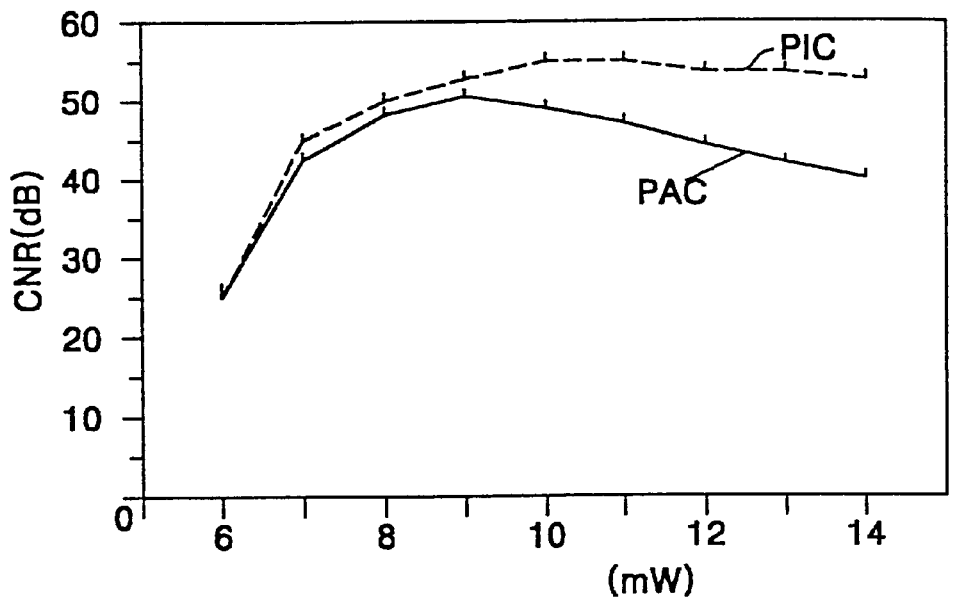
FIG. 5A represents a CNR characteristic according to a write power of the phase-change optical disc in FIG. 3.
Figure 5B:
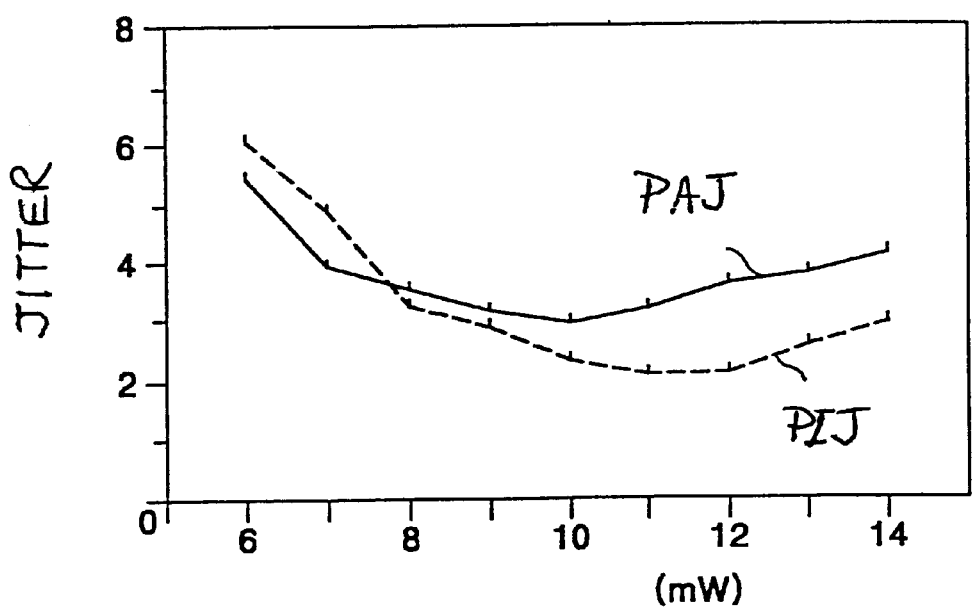
FIG. 5B represents a jitter amount according to a write power of the phase-change optical disc in FIG. 3.

FIG. 5A represents a carry to noise ratio(CNR) according to a write power of a light beam irradiated onto the phase-change optical disc. In FIG. 5A, a curve PIC represents a change of CNR in the phase-change optical disc according to an embodiment of the present invention; while a curve PAC represents a change of CNR in the conventional phase-change optical disc. It can be seen from the two curves PIN and PAC in FIG. 5A that the phase-change optical disc according to an embodiment of the present invention has an improved CNR compared with the conventional phase-change optical disc. FIG. 5B illustrates a change in a jitter amount in relation to the write power of a light beam irradiated onto the phase-change optical disc. In FIG. 5B, a curve PIJ represents a jitter amount change in the phase-change optical disc according to an embodiment of the present invention; while a curve PAJ represents a jitter amount change in the conventional phase-change optical disc. It can be seen from the two curves PIJ and PAJ that a jitter amount in the phase-change optical disc according to an embodiment of the present invention is dramatically reduced compared with a jitter amount in the conventional phase-change optical disc.

As described above, in the phase-change optical disc according to the present invention, a heat flow in the recording layer is controlled by the heat flow control layer, thereby improving a heat response characteristic as well as dramatically narrowing a width of the crystal particle ring generated by the SSE. Accordingly, a characteristic of a signal reproduced from the phase-change optical disc according to the present invention using the PWM system can be improved.

Although the present invention has been explained by the embodiments shown in the drawings described above, it should be understood to the ordinary skilled person in the art that the invention is not limited to the embodiments, but rather that various changes or modifications thereof are possible without departing from the spirit of the invention. Accordingly, the scope of the invention shall be determined only by the appended claims and their equivalents.

What is claimed is:

1. A phase-change optical disc, comprising:
   a recording layer;
   a dielectric layer formed on the surface of the recording layer; and
   a heat flow control layer formed in such a manner to include a material having a high heat conductivity and a material having a low heat conductivity on the surface of the dielectric layer, wherein said heat flow control layer comprises a heat response expediting layer having a high heat conductivity, a heat compensating layer having a low heat conductivity and a reflective layer between said dielectric layer and said heat compensating layer, said heat response expediting layer being formed on an upper portion of said heat compensating layer.

2. The phase-change optical disc as claimed in claim 1, wherein said heat compensating layer is made from any one of Si, SiN, $SiO_2$ and $ZnS$—$SiO_2$.

3. The phase-change optical disc as claimed in claim 1, wherein said heat response expediting layer is made from Al or Au.

4. The phase-change optical disc of claim 1, wherein said heat compensating layer has a thickness of 20 to 50 nm.

5. The phase-change optical disc of claim 1, wherein said heat response expediting layer has a thickness of 50 to 100 nm.

* * * * *